(12) United States Patent
Li et al.

(10) Patent No.: US 8,972,091 B2
(45) Date of Patent: Mar. 3, 2015

(54) REDUCED CENTRAL PROCESSING UNIT LOAD AND MEMORY USAGE BATTERY STATE OF CHARGE CALCULATION

(71) Applicant: Ford Global Technologies, LLC, Dearborn, MI (US)

(72) Inventors: Yonghua Li, Ann Arbor, MI (US); Richard Dyche Anderson, Plymouth, MI (US); Xu Wang, Dearborn, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 37 days.

(21) Appl. No.: 13/794,975

(22) Filed: Mar. 12, 2013

(65) Prior Publication Data

US 2014/0277866 A1  Sep. 18, 2014

(51) Int. Cl.
*H02J 7/00* (2006.01)
(52) U.S. Cl.
USPC ............................................. 701/22; 320/136
(58) Field of Classification Search
USPC ............... 701/22, 36; 320/136, 116, 132, 107
See application file for complete search history.

(56) References Cited

U.S. PATENT DOCUMENTS

| | | | |
|---|---|---|---|
| 6,534,954 B1 | 3/2003 | Plett | |
| 7,193,391 B2 | 3/2007 | Moore | |
| 7,602,146 B2 * | 10/2009 | Carrier et al. | 320/120 |
| 8,427,107 B2 * | 4/2013 | Firehammer | 320/128 |
| 2008/0054850 A1 * | 3/2008 | Tae et al. | 320/136 |
| 2011/0130986 A1 * | 6/2011 | Plett | 702/63 |
| 2013/0265058 A1 * | 10/2013 | Danner | 324/433 |

FOREIGN PATENT DOCUMENTS

| | | |
|---|---|---|
| DE | 102010039915 A1 | 3/2012 |
| WO | W02006057468 A1 | 6/2006 |

OTHER PUBLICATIONS

Carmelo Speltino et al., Cell Equalization in Battery Stacks Through State of Charge Estimation Polling, 6 pgs.
Gregory L. Plett, Extended Kalman Filtering for Battery Management Systems of LiPB-Based HEV Battery Packs, Journal of Power Sources 134 (2004), pp. 277-292.
(Continued)

*Primary Examiner* — Tan Q Nguyen
(74) *Attorney, Agent, or Firm* — David B. Kelley; Brooks Kushman P.C.

(57) ABSTRACT

A vehicle having a battery pack with cells grouped into subsets and at least one controller programmed to charge and discharge the battery pack is disclosed. A control output is generated based on a pack state of charge derived from each cell's initial state of charge at vehicle activation and an electric charge accumulated or spent by less than all of the cells of each of the subsets since vehicle activation. A method of estimating battery pack state of charge is disclosed in which a pack state of charge is calculated by identifying subsets of cells having similar properties and calculating an electric charge accumulated or spent for fewer than all of the cells of each subset. A cell state of charge is calculated for all cells based on an average electric charge accumulated or spent. The pack state of charge is based on all the cell states of charge.

20 Claims, 4 Drawing Sheets

(56) References Cited

OTHER PUBLICATIONS

Gregory L. Plett, Efficient Battery Pack State Estimation Using Bar-Delta Filtering, EVS24, Stavanger, Norway, May 13-16, 2009, 8 pgs.

Domenico Di Domenico et al., Lithium-Ion Battery State of Charge and Critical Surface Charge Estimation Using an Electrochemical Model-Based Extended Kalman Filter, Journal of Dynamic Systems, Measurement and Control, Nov. 2010, vol. 132, 11 pgs.

* cited by examiner

REDUCED CENTRAL PROCESSING UNIT LOAD AND MEMORY USAGE BATTERY STATE OF CHARGE CALCULATION

TECHNICAL FIELD

This disclosure relates to battery pack state of charge determinations.

BACKGROUND

Modern hybrid and electric vehicles utilize battery packs to provide energy for propulsion and for storing regenerated energy. Battery packs are typically composed of multiple individual battery cells that may be connected in parallel, series or some combination thereof. A characteristic of the battery pack is state of charge (SOC). The battery pack SOC is a measure of the fraction of the total charge that remains in the battery pack and may be considered analogous to a fuel gauge. SOC may be important for determining when and how to charge or discharge the battery pack. SOC may also be important for providing information to the driver, such as vehicle drive range, and for operating the vehicle.

SUMMARY

A vehicle is disclosed that is comprised of a battery pack having cells that are grouped into subsets and at least one controller programmed to charge and discharge the battery pack. The charging and discharging of the battery pack is based on a pack SOC that is determined from an initial state of charge of each of the cells upon vehicle activation and an electric charge accumulated or spent by each of less than all of the cells of each of the subsets since vehicle activation. The cells of each subset have a specified set of cell parameter values falling within a specified range of values where each subset has a different range of values. The cell parameter values may include a specified range of temperatures, initial cell states of charge or capacities, or cell ages. The cells may be grouped into subsets such that the cells may be scattered throughout the battery pack.

A method is disclosed for controlling a vehicle including a battery pack. The steps include identifying subsets of cells having similar parameter values and calculating an electric charge accumulated or spent for less than all of the cells in each of the subsets. The similar parameter values may include a specified range of temperatures, initial cell states of charge or cell ages. In one possible embodiment, the electric charge accumulated or spent may be calculated for one cell in each subset. An average electric charge accumulated or spent for the pack is calculated based on the electric charge accumulated or spent for each subset. A cell state of charge for each cell of the pack is calculated from the average charge accumulated or spent. A battery pack state of charge is calculated based on all of the cell states of charge. A control output for the vehicle is generated based on the battery pack state of charge. The step of identifying subsets may be performed upon vehicle activation or during a vehicle drive cycle.

A method for estimating a battery pack state of charge is disclosed in which the cells of the battery pack are grouped into subsets. A battery pack state of charge is calculated based on an initial state of charge upon vehicle activation for each cell and an electric charge accumulated or spent since vehicle activation for fewer than all of the cells in each of the subsets. The battery pack state of charge is used to output information for vehicle control or display. The grouping into subsets may be based on temperature, initial state of charge, capacity, and cell age.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
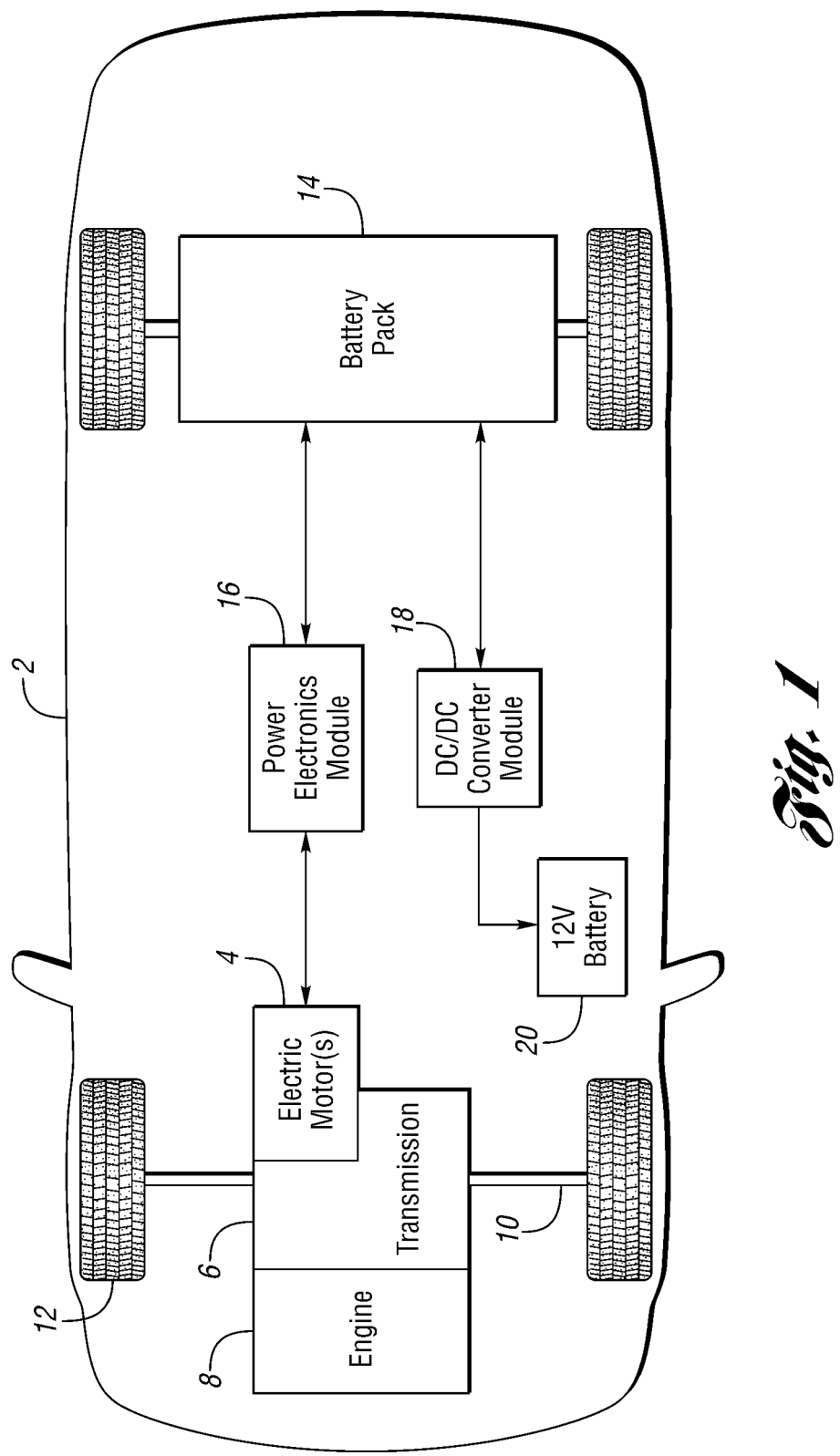
FIG. 1 is a diagram of a hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 3. In addition, the hybrid transmission 6 is mechanically connected to an engine 8. The hybrid transmission 6 is also mechanically connected to a drive shaft 10 that is mechanically connected to the wheels 12. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 stores energy that can be used by the electric motors 4. A vehicle battery pack 14 typically provides a high voltage DC output. The battery pack 14 is electrically connected to the power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The method described herein is equally applicable to a pure electric vehicle or any other device using a battery pack.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

Figure 2:
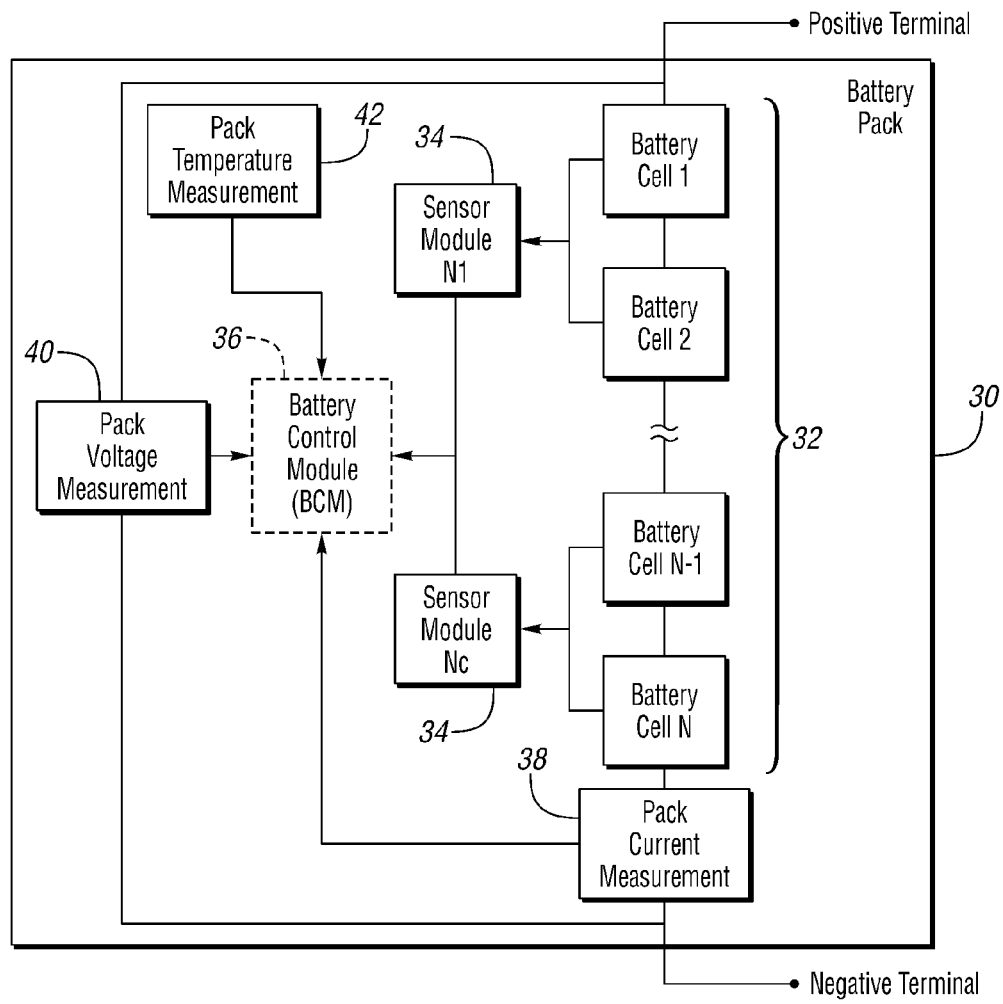
FIG. 2 is a diagram of a possible battery pack arrangement comprised of multiple cells, and monitored and controlled by a Battery Control Module.

Battery packs may be constructed from a variety of chemical formulations. Typical battery pack chemistries are lead acid, nickel-metal hydride (NIMH) or Lithium-Ion. FIG. 2 shows a typical battery pack 30 in a simple series configuration of N battery cells 32. Other battery packs, however, may be composed of any number of individual battery cells connected in series or parallel or some combination thereof. A typical system may have a one or more controllers, such as a Battery Control Module (BCM) 36 that monitors and controls the performance of the battery pack 30. The BCM 36 may monitor several battery pack level characteristics such as pack current 38, pack voltage 40 and pack temperature 42.

In addition to the pack level characteristics, there may be battery cell level characteristics that need to be measured and monitored. For example, the terminal voltage, current, and temperature of each cell may be measured. A system may use a sensor module 34 to measure the battery cell characteristics. Depending on the capabilities, the sensor module 34 may measure the characteristics of one or multiple of the battery cells 32. The battery pack 30 may utilize up to $N_c$ sensor modules 34 to measure the characteristics of all the battery cells 32. Each sensor module 34 may transfer the measurements to the BCM 36 for further processing and coordination. The sensor module 34 may transfer signals in analog or digital form to the BCM 36.

An important measure of the battery system may be the SOC of the battery pack. Battery pack SOC gives an indication of how much charge remains in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration. One possible disadvantage to this method is that the current measurement may be noisy. Possible inaccuracy in the state of charge may occur due to the integration of this noisy signal over time.

Some modern SOC estimation methods use model-based methods, such as Kalman filtering, to determine a more accurate SOC. A model-based method works by using a model of the battery cell and then predicting the internal states of the battery cell based on some actual measured values. Estimated internal states may include, but are not limited to, voltages, currents, or SOC. A typical approach is to apply a Kalman filter to each cell of the battery pack and then use these cell values for calculating the overall pack characteristics. This requires the controller to execute a number of Kalman filters that is equal to the number of cells present in the battery pack. The number of cells in a battery pack varies, but a modern vehicle battery pack may consist of 80 or more cells.

Figure 3:
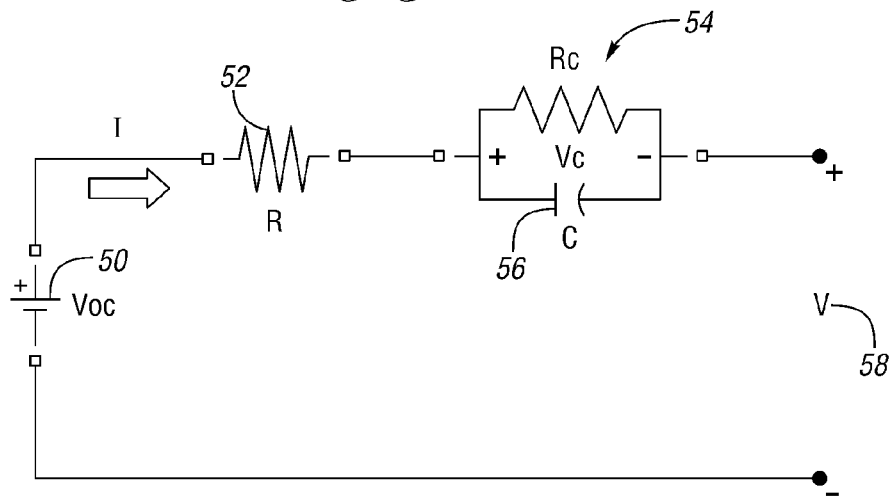
FIG. 3 is a diagram of an example battery cell equivalent circuit.

FIG. 3 shows a typical battery cell equivalent circuit model. A battery cell can be modeled as a voltage source ($V_{oc}$) 50 having resistances (52 and 54) and capacitance 56 associated with it. Because of the battery cell impedance, the terminal voltage, V 58, is typically not the same as the open-circuit voltage, $V_{oc}$ 50. The open-circuit voltage, $V_{oc}$ 50, is not readily measurable as only the terminal voltage 58 of the battery cell is accessible for measurement. Because the $V_{oc}$ 50 is not readily measurable, a model-based method may be used to estimate the value. Any model will require that the values of resistance and capacitance be known or estimated. Note that the battery cell model may depend on the battery chemistry. The precise model chosen for the battery cell is not critical to the method described.

Using Kirchoff's Current and Voltage laws and well known properties of circuit elements, the equivalent circuit of FIG. 3 can be expressed by the following equations:

$$V_{oc}(t) = R * I(t) + V_c(t) + V(t) \quad (1)$$

$$C * \frac{dV_c(t)}{dt} = I(t) - \frac{V_c(t)}{R_c} \quad (2)$$

Using the following relationships $$\frac{dSOC}{dt} = -\frac{\eta I}{Q} \text{ and } \frac{dV_{oc}}{dt} = \frac{dV_{oc}}{dSOC} * \frac{dSOC}{dt},$$

the derivative of $V_{oc}$ can be expressed as follows:

$$\frac{dV_{oc}(t)}{dt} = -\frac{dV_{oc}}{dSOC} * \frac{\eta I}{Q} \quad (3)$$

where

η is the charge/discharge efficiency, and

Q is the cell charge capacity.

I is the current flowing in and out of the battery. In this case, discharge current (current flowing out of the battery) is considered positive.

Combining equations (1) through (3) yields the following:

$$\begin{bmatrix} \frac{dV_{oc}}{dt} \\ \frac{dV_c}{dt} \end{bmatrix} = \begin{bmatrix} 0 & 0 \\ 0 & -\frac{1}{C*R_c} \end{bmatrix} * \begin{bmatrix} V_{oc} \\ V_c(t) \end{bmatrix} + \begin{bmatrix} -\frac{dV_{oc}}{dSOC}*\eta \\ \frac{1}{C} \end{bmatrix} * I \quad (4)$$

$$V(t) = \begin{bmatrix} 1 & -1 \end{bmatrix} * \begin{bmatrix} V_{oc}(t) \\ V_c(t) \end{bmatrix} + [-R] * I \quad (5)$$

An observer for equations (4) and (5) can be expressed as follows:

$$\begin{bmatrix} \dfrac{d\hat{V}_{oc}}{dt} \\ \dfrac{d\hat{V}_c}{dt} \end{bmatrix} = \begin{bmatrix} 0 & 0 \\ 0 & -\dfrac{1}{C*R_c} \end{bmatrix} * \begin{bmatrix} \hat{V}_{oc} \\ \hat{V}_c(t) \end{bmatrix} + \begin{bmatrix} -\dfrac{d\hat{V}_{oc}}{dSOC}*\eta \\ \dfrac{1}{C} \end{bmatrix} *I + \quad (6)$$

$$L*(V(t) - \hat{V}(t))$$

$$\hat{V}(t) = [1 \quad -1] * \begin{bmatrix} \hat{V}_{oc}(t) \\ \hat{V}_c(t) \end{bmatrix} + [-R]*I \quad (7)$$

where
V(t) is the measured cell terminal voltage,
$\hat{V}(t)$ is an estimate of the cell terminal voltage,
$\hat{V}_{oc}$ is an estimate of the cell open-circuit voltage,
$\hat{V}_c$ is an estimate of the voltage across the capacitive element, and
L is a gain matrix chosen so that the error dynamics are stable under all conditions.

A Kalman filter-based recursive parameter estimation scheme can be used to estimate the parameters (R, $R_c$, C) of the observer of equations (6) and (7). A discretized form of these parameters can be expressed as a function of the system states as follows:

$$\left[\dfrac{T_s}{2}*(V_{oc}(k+1) - V(k+1) + V_{oc}(k) - V(k))\right] = \quad (8)$$

$$\left[(V(k+1) - V_{oc}(k+1))\dfrac{T_s}{2}*(I(k+1) + I(k))I(k+1)\right] * \begin{bmatrix} R_c*C \\ R+R_c \\ R*R_c*C \end{bmatrix}$$

The Kalman filter recursive parameter estimation can be achieved by expressing equation (8) in the form:

$$Y(k) = \Phi^T(k)*\Theta(k) \quad (9)$$

The Kalman filter estimation scheme may then expressed by the following equations:

$$\hat{\Theta}(k+1) = \hat{\Theta}(k) + K(k)*(Y(k+1) - \Phi^T(k)*\hat{\Theta}(k)) \quad (10)$$

$$K(k+1) = Q(k+1)*\Phi(k+1) \quad (11)$$

$$Q(k+1) = \dfrac{P(k)}{R_2 + (\Phi^T(k+1)*P(k)*\Phi(k+1))} \quad (12)$$

$$P(k+1) = P(k) + R_1 - \dfrac{P(k)*\Phi(k)*\Phi^T(k)*P(k)}{R_2 + (\Phi^T(k+1)*P(k)*\Phi(k+1))} \quad (13)$$

where $\hat{\Theta}(k+1)$ is the estimate of the parameters from equation (8), K, Q, and P are calculated as shown, and $R_1$ and $R_2$ are constants. After the parameters are calculated using the Kalman filter algorithm, the parameters can be used in equations (6) and (7) to obtain an estimate of the state variables. Once $V_{oc}$ is estimated, the value of SOC can be determined.

The method to be described is applicable to other model-based formulations as well. The above filtering scheme described by equations (1) through (13) is but one example of a model-based estimation scheme. This algorithm is applicable to any implementation where an internal state calculation is performed in order to compute the state of charge. The internal state calculation may directly or indirectly be used to calculate the state of charge. The selection of internal states may differ and the method may still be applied. Another possibility is to use SOC as an internal state and make an estimate of this value directly. The method described in this case calculates internal voltage states and then derives SOC from these voltage predictions. The model and states used may depend on the particular circuit model used where the circuit model shown in FIG. 3 is one example.

Figure 5:
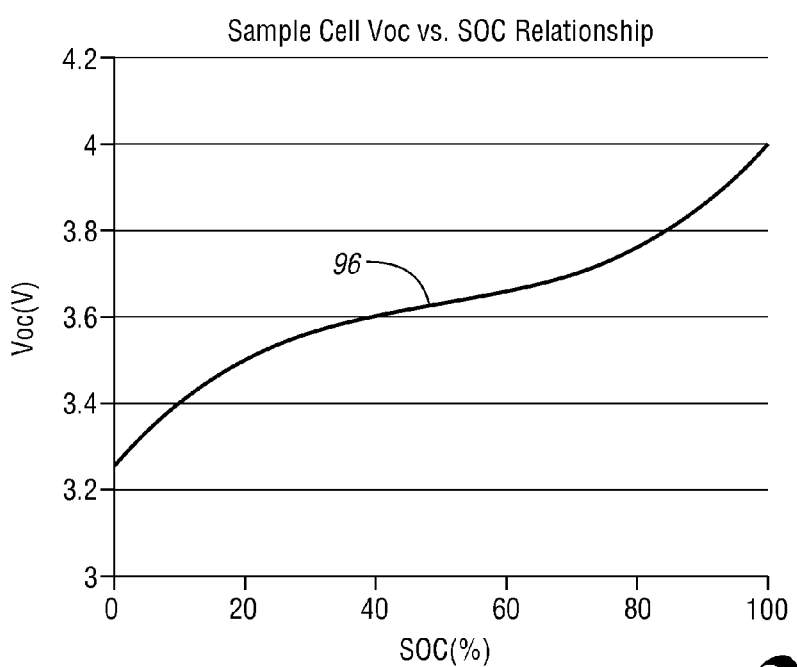
FIG. 5 is a graph of a possible open-circuit voltage (Voc) vs. battery state of charge (SOC) relationship for a typical battery cell.

For the typical battery cell considered, there is a relationship between SOC and $V_{oc}$ such that $V_{oc}$=f(SOC). FIG. 5 shows a typical curve 96 showing $V_{oc}$ as a function of SOC. The relationship between SOC and $V_o$, may be determined from an analysis of battery properties or from testing the battery cells. Once the estimated $V_{oc}$ value is known, the estimated battery cell SOC can be determined using the relationship between SOC and $V_{oc}$. This may be implemented as a table lookup or an equivalent equation. The prior description is just one possible implementation of a model-based scheme for calculating SOC. The method described is applicable to other model-based schemes as well.

An advantage of the Kalman filter method is that it may achieve better accuracy than can be obtained from the ampere-hour integration method. However, having to execute a Kalman filter for each individual cell may require more memory and computation time than the controller has available. The problem can become more noticeable with a higher number of cells in the battery pack. Depending on the computing resources available, there may not be enough resources available to effectively implement a Kalman filter for each battery cell.

The computation time problem becomes more apparent when one considers a typical microcontroller used for automotive applications. In order to remain cost effective, microcontrollers are chosen with limited amounts of static and dynamic memory. In addition, limitations on clock speeds may restrict the processing speed of the microcontroller. Other functions such as diagnostics and communications may also be executed in the controller, further reducing the computation time available to the state of charge algorithm. The net result is that only limited microcontroller resources are available to perform the state of charge calculation.

In certain circumstances, one of the goals may be to provide a more efficient computational structure for calculating battery SOC. The method may accomplish this by reducing the number of cells that are to be processed using a computationally complex algorithm, such as the Kalman filter described earlier. The approach attempts to place cells with similar parameters into subsets and then implement the model-based computations on a representative member or members of that subset. Other cells in that subset may then use the calculated values of the representative member(s). This algorithm allows an accurate state of charge to be estimated while keeping computational load and memory usage within the constraints of the microcontroller. The method may apply to any configuration of battery cells and can be extended to different methods of calculating battery cell SOC.

Figure 6:
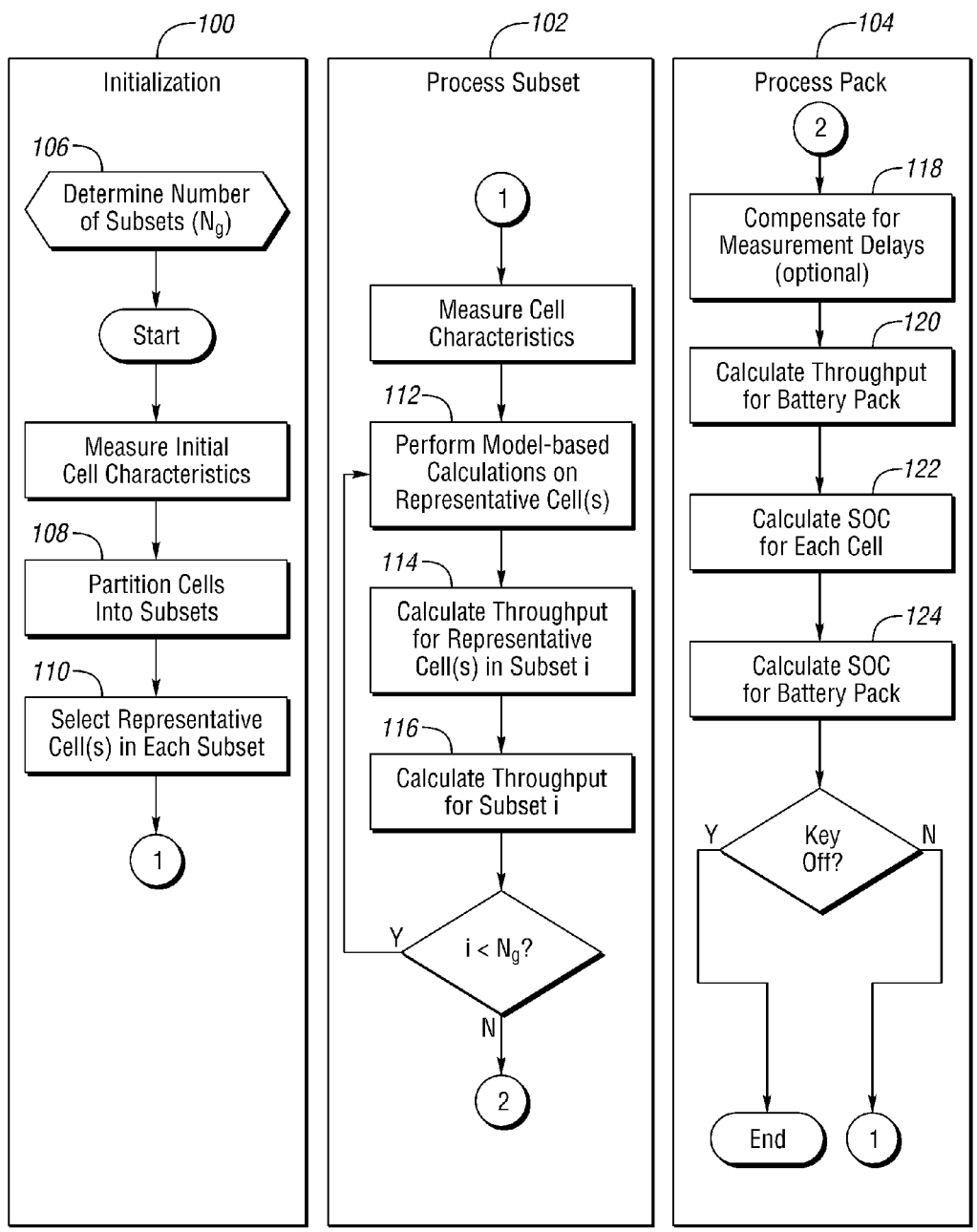
FIG. 6 is a flowchart of an algorithm for determining battery SOC.

The initial step is to determine the number of representative cells that the controller can effectively process. The runtime requirements for processing one representative cell can be determined by implementing the desired algorithm and measuring the execution time of that algorithm. Static and dynamic memory requirements may be determined from compiler and linker output files. The base execution time is denoted $R_{base}$ and the base dynamic memory requirement is denoted $M_{base}$. FIG. 6 shows a high level flowchart of one possible implementation of the algorithm. The first step at initialization 100 may be an offline determination of the number of cell calculations that can be handled by the controller.

The maximum runtime and memory allocated to the state of charge algorithm may be a function of the system design constraints. Note that if there are no constraints on memory or processing speed, there may be no need to find a computationally efficient state of charge estimation scheme. One would merely execute the algorithm on each cell with no concern for memory or execution time. The constraints on execution time and dynamic memory may be denoted $R_{max}$ and $M_{max}$ respectively. The maximum number of cells that can be processed based on the runtime constraint is $N_r = R_{max}/R_{base}$. The maximum number of cells that can be processed based on the dynamic memory constraint is $N_m = M_{max}/M_{base}$. To arrive at the maximum number of cells ($N_g$) that can be handled within the system constraints, the minimum of $N_r$ and $N_m$ should be selected. This description considers dynamic memory but static memory requirements can be handled in the same manner. In fact, any other constraint on how many cells may be processed can be considered with this scheme.

Once the number ($N_g$) of possible subsets that can be executed within the system constraints is determined, a method of partitioning the cells into subsets may be determined. As one possible approach to determining the subsets, cells can be analyzed based on battery cell parameters such as battery physics, chemistry, age, temperature or SOC. Each cell may be parameterized and placed into a subset based on their measured parameters. Cells of each of the subsets may have a specified set of cell parameter values falling within a specified range of values and the specified range of values for each of the subsets may be different. Various measurements or values may be available for each cell such as temperature data, voltage data and initial state of charge data. One possible method to grouping cells is to consider the following factors: battery age, temperature, and initial SOC. The idea being that battery cells having the same age, temperature and SOC are likely to operate similarly.

One possible approach to determining the subsets is to first divide the battery cells into $N_T$ subsets, where $N_T < N_g$. This division may be based on the temperature at power-on of the battery cells. $N_T$ temperature ranges may be defined. The division may be achieved by a k-means clustering, where a number of data points are divided into k ($N_T$) clusters based on a well-known statistical algorithm. Once the cells are divided by temperature ranges, each subset may then be divided according to SOC. A number of SOC ranges may now be defined. Again, this may be achieved by a k-means clustering of SOC data for each subset determined from temperature. If the total number of groups is less than $N_g$, this step may be complete or can be repeated until up to $N_g$ subsets are determined. There is no limit as to how the grouping or clustering can be performed. One may select a predefined range of temperatures or a predefined range of states of charge for the subsets. Any other statistical, mathematical or graphical method may be applied to cluster the battery cells with similar parameter values into the same subsets.

The subset where a battery cell is placed does not depend on the location within the battery pack. The battery cells in a subset may be scattered throughout the battery pack. The sorting into subsets is performed in such a way that cells with similar parameters are within a given subset. Thus, using any of the cells within a subset for calculations should yield a reliable result for all of the other cells within the subset.

One possible implementation of this method is to determine the subsets at system power-on. Cells may be sorted based on their initial temperature and initial SOC values calculated at power-on. Subsets may be determined based on a specified range of initial states of charge or a specified range of cell temperatures. For a Lithium-Ion battery, the cell SOC may be determined at initialization. If the pack has been inactive for some period of time, the terminal voltage of the cell will be the same as the open-circuit voltage of the cell. FIG. 6 depicts such an approach in which the grouping 100 determination is performed at system power-up.

Figure 4:
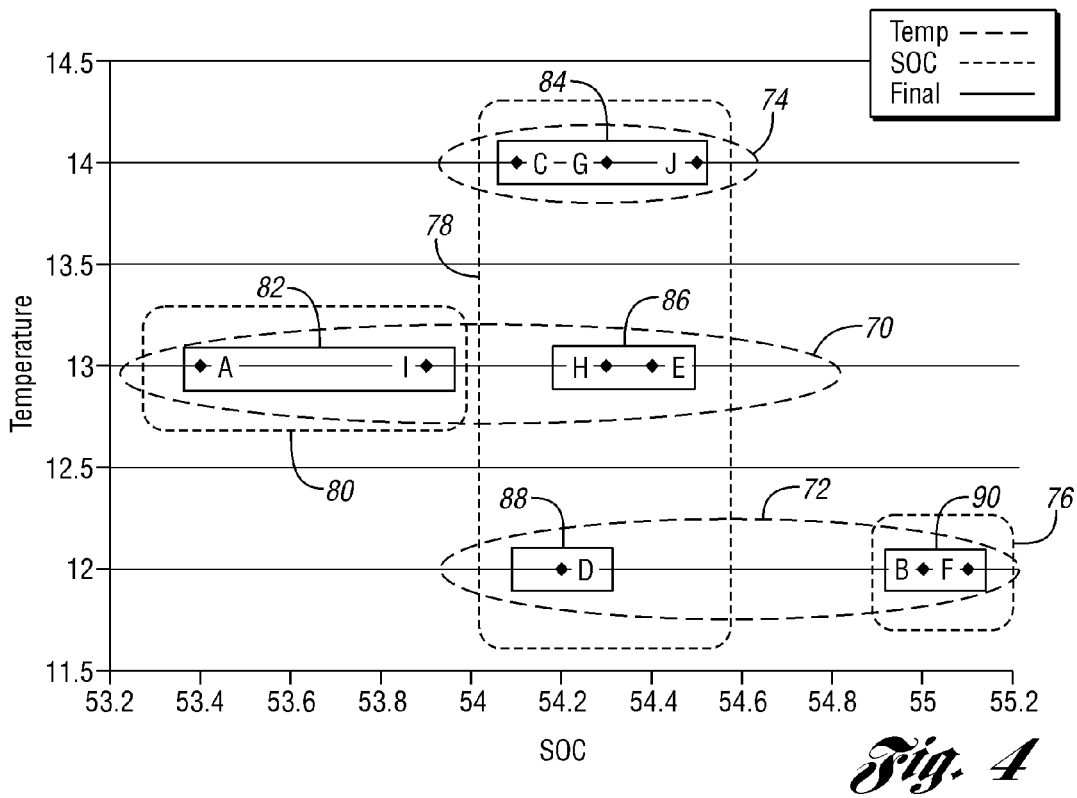
FIG. 4 is a chart of a sample cell grouping based on temperature and cell state of charge.

FIG. 4 shows an example grouping for a battery pack containing ten cells (A-J). In this example, the cells are to be grouped into five groups. The first step in this case is to group the cells into three subsets based on temperature 70, 72, 74 (depicted by ovals). The temperature grouping creates three subsets of {A, E, H, I}, {C, G, J}, and {B, D, F}. The next step in this example is to group the cells into three subsets based on initial SOC 76, 78, 80 (depicted by rounded rectangles). The SOC grouping creates three subsets of {A, I}, {C, D, E, G, H, J}, and {B, F}. The temperature and SOC based subsets are then analyzed for any intersections and these intersections may be chosen as the final subsets. In this example, there are clear intersections between the temperature and SOC subsets depicted by rectangles. The example grouping in FIG. 4 shows that cells are grouped as {A, I} 82, {C, G, J} 84, {E, H} 86, {D} 88, and {B, F} 90. The method of determining the subsets may depend on whether it will be done offline or in real-time using an algorithm implemented in software.

Within each subset, at least one representative cell must be chosen. For example, in the subset {C,G,J} 84, one of the three cells C, G, or J must be chosen as the representative member. Various methods can be used to select the representative member: the closest to the average value, the highest or lowest SOC, or the highest or lowest temperature. The choice of a representative member is robust as the cells have already been grouped and should be similar with regard to these parameters. When selecting the representative cells, one may prefer to choose cells having a representative nonlinear characteristic. Selection may also be based on any other criteria without affecting the basic approach disclosed. FIG. 6 depicts such an approach in which the representative cell 110 determination is performed at system power-up.

The determination of the subsets may be performed in advance based on a calibration or initialization procedure and stored in non-volatile memory. The subsets may also be determined at system power-up. The algorithm is flexible as to when the subsets are determined. The subset selection may also be performed dynamically at run time with the members of the subsets changing over time during the same ignition cycle. Dynamic selection is particularly useful if there is a problem with a cell measurement, for example. In this situation, another representative cell that is functioning properly can be alternatively chosen for the calculation. Dynamic selection allows for a more robust, fault tolerant calculation with the ability to continue despite some measurement failures. There is no limitation as to when the subsets are determined. In FIG. 6, the partitioning into subsets is shown as occurring during initialization of the system 108.

In general, the model-based calculations would be performed on only one cell of each subset. Depending on the resources available, it may be desired to perform the model-based calculations on more than one member of a subset. The algorithm supports this modification and can be scaled up or down depending on the controller constraints. Calculations may be performed on one or more representative cells, depending on the system constraints. One possible way to use multiple representative cells is to use the average value of the representative cells.

One possible technique of implementing this method is to determine the required calculation rate of the battery pack SOC, $\Delta T_{pack}$. This rate is then divided by the number of subsets, $N_g$, to yield the sample period for each subset, $\Delta T_g$. In each sub-period, the model-based calculations (102 referring to FIG. 6) for one subset may be executed. Once all the sub-period calculations are completed, the battery pack SOC may be calculated. The calculation period for battery pack SOC can be performed in an outer execution loop 104 while the individual battery cell model calculations may be performed in an inner loop 102 that runs more frequently than the outer loop. When the inner loop battery cell SOC calculations have been performed, the pack level battery SOC calculation can be performed. Other implementations are possible and may depend upon the hardware and operating system being used. FIG. 6 shows one possible division of functions into different high-level tasks for initialization 100, processing the subsets 102 and processing the pack information 104. In FIG. 6, the Process Group functions 102 may be performed at intervals of $\Delta T_g$ and the Process Pack task 104 may be performed at intervals of $\Delta T_{pack}$.

Once the representative cells have been selected, battery cell characteristics can be measured and processed using the model-based algorithm 112. Model values can then be used to calculate the throughput of each cell 114. Throughput can be defined as the amount of charge that passes into or out of the battery during a given time interval or the amount of electric charge accumulated or spent over a given time. Throughput can be calculated by the following formula:

$$\text{Throughput} = \int_0^T \eta I(t) dt \quad (14)$$

where
$\eta$ is the charge/discharge efficiency, and
$I(t)$ is the current.

Other ways to calculate the throughput are with model based approaches. The use of equation (14) may lead to accumulated integration errors based on noise in the current measurement. Each cell is presumed to have the same throughput value although in practice there may be some differences due to cell monitoring hardware, cell balancing hardware and charge efficiency differences. The method considered in this application is concerned with more complex model-based approached, but the method applies to simpler calculations as well.

For a model-based approach, the throughput of each representative cell may be calculated 114. The throughput may be determined from cell state of charge data. The open circuit voltage ($V_{oc}$) values for each representative cell are first determined, possibly from a model-based algorithm 112. Once an estimate of $V_{oc}$ is available, SOC can be determined from the $V_{oc}$ vs. SOC relationship (see FIG. 5). The throughput for the representative cell 114 can be determined by $$\text{Throughput}(Cell_i) = (SOC(0) - f^{-1}(V_{oc}(Cell_i))) * Q(Cell_i) \quad (15)$$

where
$Cell_i$ is one of the representative cells,
$f^{-1}(V_{oc}(Cell_i))$ is the SOC value determined from $V_{oc}$ (see FIG. 5) of the representative cell i,
$SOC(0)$ is the SOC at power up, and
$Q(Cell_i)$ is the charge capacity of the representative cell.
The throughput of the group 116 may then be calculated as follows:

$$\text{Throughput}(Group_i) = (\Sigma_1^{Nrc} \text{Throughput}(Cell_j))/N_{rc} \quad (16)$$

where
$N_{rc}$ is the number of representative cells used in the subset.
Note that equation (16) calculates the average value of the representative cells of the subset. In the case where there is only one representative cell per subset, equation (16) is not required since there is no need to calculate the average of only one value. When calculating the throughput for more than one representative value, statistical methods other than averaging may also be used. It is possible that under different conditions such as charging or discharging one may prefer to select the maximum or minimum representative value instead.

In an implementation where the subset values are calculated before the pack values, there may be calculation delays from the time a subset is calculated to the time the pack SOC is calculated. These delays can be compensated for 118 by adding an estimated throughput for this time period. Assume that the pack SOC is calculated every $\Delta T_{pack}$ seconds. Now assume that a subset is calculated every $\Delta T_g = \Delta T_{pack}/N_g$ seconds. The basic idea is to perform ampere-hour integration for the time between when the cell throughput was determined to the time when the battery SOC is to be calculated. Since this is a short time period, there is little risk of introducing excessive noise from the current measurement. The throughput for each cell may be compensated for the calculation delays using the following formula:

$$\text{Throughput}(Group_j, t(K+1)) = \text{Throughput}(Group_j, t(K) + j * \Delta T_g) + \int_{t(K)+j*\Delta T_g}^{t(K+1)} \eta I(t) dt \quad (17)$$

where
j is the group number (1 to $N_g$),
The average battery pack throughput 120 may be calculated as $$\text{Average Throughput} = \frac{\left(\sum_1^{N_g} \text{Throughput}(Group_i)\right)}{N_g} \quad (18)$$

The SOC for each cell 122 may then be calculated as $$SOC(Cell_i, t) = SOC(Cell_i, 0) - (\text{Average Throughput}/Q(Cell_i)) \quad (19)$$

Finally, the pack SOC may be determined 124 from the individual cell SOC values. There are several methods of determining pack SOC from the individual cell SOC values. At higher pack SOC values, one might use the highest cell SOC to prevent overcharging any of the cells. At lower pack SOC values, one might choose the lowest pack SOC to prevent completely discharging any of the cells. In between, one may choose an average value of the cell SOC values as the pack SOC. The algorithm described will work with any method of calculating the pack SOC from the individual values. The equations described may be adjusted based on the sign convention chosen for current.

The controller may generate an output based on the calculated battery pack SOC. The output may be communicated to other control modules for controlling the operation of the vehicle. In a hybrid-electric vehicle, the battery pack SOC may be used to determine a control output for selecting an appropriate mode of operation, such as when the engine should be running A vehicle control output, such as an engine start request or an electric motor torque request, may also be determined based in part on the battery pack SOC value. As another example, the battery pack SOC output may be used for controlling the charging and discharging of the battery pack. The controller may output the battery pack SOC to a driver display module so that the driver may be informed of the charge remaining in the battery pack.

The algorithm described may be executed by one or more controllers and the algorithm may be repeated as long as the system is powered on. The calculations can be stopped when power to the controller is turned off. The system may store values to non-volatile memory for the next power-on cycle if necessary.

The method described provides a computationally efficient way of implementing certain complex algorithms with limited computing resources. The method is not necessarily limited to the battery state of charge implementation described above. The method has application to other areas in which there may be a system comprised of similar elements that can be characterized and partitioned into groups.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery pack including cells grouped into a plurality of subsets; and
   a controller programmed to charge and discharge the battery pack according to a state of charge of the battery pack derived from an initial state of charge of each of the cells at vehicle activation and an electric charge accumulated or spent by each of less than all of the cells of each of the subsets since vehicle activation.

2. The vehicle of claim 1, wherein the cells are grouped into a plurality of subsets such that at least some of the cells of one or more of the subsets are scattered throughout the battery pack.

3. The vehicle of claim 1, wherein all of the cells of each of the subsets have a specified set of cell parameter values falling within a specified range of values and wherein the specified range of values for each of the subsets is different.

4. The vehicle of claim 3, wherein the specified set of cell parameter values includes a specified range of temperatures.

5. The vehicle of claim 3, wherein the specified set of cell parameter values includes a specified range of initial states of charge or capacities.

6. The vehicle of claim 3, wherein the specified set of cell parameter values includes a specified range of cell ages.

7. The vehicle of claim 1, wherein the at least one controller is further programmed to group the cells into the plurality of subsets upon vehicle activation.

8. A method of controlling a vehicle comprising:
   identifying a plurality of subsets of cells forming a battery pack, wherein the cells of each of the subsets have a specified set of cell parameter values falling within a specified range of values and wherein the specified range of values for each of the subsets is different;
   calculating an electric charge accumulated or spent by less than all of the cells of each of the subsets based on cell state of charge data;
   calculating an average electric charge accumulated or spent by the battery pack based on the electric charge accumulated or spent by less than all of the cells for each of the subsets;
   calculating a cell state of charge for each of the cells based on the average electric charge accumulated or spent by the battery pack;
   calculating a battery pack state of charge based on the cell states of charge; and
   generating a control output for the vehicle based on the battery pack state of charge.

9. The method of claim 8, wherein calculating an electric charge accumulated or spent by less than all of the cells of each of the subsets based on cell state of charge data includes calculating an electric charge accumulated or spent by no more than one of the cells of each of the subsets.

10. The method of claim 8, wherein the specified set of cell parameter values includes a specified range of temperatures.

11. The method of claim 8, wherein the specified set of cell parameter values includes a specified range of initial states of charge or capacities.

12. The method of claim 8, wherein the specified set of cell parameter values includes a specified range of cell ages.

13. The method of claim 8, wherein the step of identifying is performed upon vehicle activation.

14. The method of claim 8, wherein the step of identifying is periodically performed during a drive cycle of the vehicle.

15. A method for estimating a battery pack state of charge comprising:
   grouping cells of the battery pack into a plurality of subsets;
   calculating a battery pack state of charge based on an initial state of charge of each of the cells at vehicle activation and an electric charge accumulated or spent by each of less than all of the cells of each of the subsets since vehicle activation; and
   outputting information based on the battery pack state of charge for vehicle control or display.

16. The method of claim 15, wherein all of the cells of each of the subsets have a specified set of cell parameter values falling within a specified range of values and wherein the specified range of values for each of the subsets is different.

17. The method of claim 16, wherein the specified set of cell parameter values includes a specified range of temperatures.

18. The method of claim 16, wherein the specified set of cell parameter values includes a specified range of initial states of charge or capacities.

19. The method of claim 16, wherein the specified set of cell parameter values includes a specified range of cell ages.

20. The method of claim 15, wherein the cells are grouped into a plurality of subsets upon vehicle activation.

* * * * *